United States Patent [19]

Bachmann

[11] 3,925,819

[45] Dec. 9, 1975

[54] TAPE HEAD ROTATOR MECHANISM FOR TRACK CHANGING

[75] Inventor: Mario E. Bachmann, Chicago, Ill.

[73] Assignee: Motorola, Inc., Chicago, Ill.

[22] Filed: Aug. 5, 1974

[21] Appl. No.: 491,027

Related U.S. Application Data

[62] Division of Ser. No. 333,411, Feb. 16, 1973, Pat. No. 3,855,628.

[52] U.S. Cl. .................... 360/106; 360/78; 360/105
[51] Int. Cl.$^2$.. G11B 5/54; G11B 5/55; G11B 21/08
[58] Field of Search ........................ 360/106, 105, 78

[56] References Cited

UNITED STATES PATENTS 3,376,396 4/1968 Bradt et al. .......................... 360/106
3,614,342 10/1971 Siebert ................................. 360/106

*Primary Examiner*—Robert S. Tupper
*Attorney, Agent, or Firm*—James W. Gillman; Donald J. Lisa

[57] ABSTRACT

A tape head rotator mechanism in a multiple track tape recorder/reproducer includes a tape head connected to a frame rotatably mounted to a reciprocable carriage which is slideably mounted in a support. A plate is pivotably mounted to the carriage and is movable in an arcuate path transverse the path of movement of the carriage. The plate carries a cam follower riding in cam tracks in the support. When the carriage is cycled, the cam tracks and follower cause movement of the plate which, through a rack gear and pinion mechanism translates into 180° rotation of the tape head.

6 Claims, 4 Drawing Figures

TAPE HEAD ROTATOR MECHANISM FOR TRACK CHANGING

This is a division of application Ser. No. 333,411, filed Feb. 16, 1973, now U.S. Pat. No. 3,855,628.

Background of the Invention

Both reel and cassette type tape recorders/players have utilized multi-track tapes for recording and reproducing sound. Generally, for positioning the tape head from one track to another in cassette-type players it has been necessary to take the cassette out of the player, turn it over and place it back in the player. Conventional reel tape devices required similar operations. In order to eliminate this objectional feature, dual tape heads have been proposed which require the tape to travel in opposite directions without removing the cassette cartridge. This device has been proved expensive.

Summary of the Invention

It is an object of the present invention to provide improved apparatus for reel-to-reel type tape recorder/reproducers wherein all the tracks on a multi-track tape may be played without reversing the position of the cartridge or the reels in the recorder/reproducer.

It is another object of this invention to provide a less costly reel-to-reel tape recorder/reproducer which will reproduce all the tracks on a multi-track tape and which utilizes only one tape head.

Briefly, the present invention has a cam track located in a base plate which is utilized for guiding a spring loaded track pin for controlling the motion of the tape head during disengagement from the tape, rotation and re-engagement with the tape. Actuation of the tape head rotator mechanism is accomplished by a solenoid which is mechanically linked to a pin extending upwardly through the base plate and moves the carriage bracket and gear plate. The head rotates and a return spring causes re-engagement of the tape head with the tape.

A carriage bracket is supported on and rides on a pair of guide rails with one rail engaging step-up cam slots in the guide rails and the second rail engaging horizontal cam slots with the tape head being raised with respect to the base plate to provide clearance with the tape head being disengaged from the tape and rotating. The rear of the carriage bracket which rides on the second guide bar moves parallel to but not vertically with respect to the base plate. The tape head frame is rotatably mounted to the carriage rack through ball bearing mounts which permit rotation of the carriage rack. The tape head rotates as the track pin moves transversely across the base plate in the cam track. Rotation of the tape head is accomplished by a pinion connected to the tape head bracket and a gear rack connected to the gear rack plate with the pinion engaging and being rotated by gear rack in response to the transverse movement of the track pin in a first leg of the cam track. With rotation complete, the solenoid is disabled and the return spring causes the tape head to re-engage the tape in an engaged condition with the track pin going to a rest position in a second leg of the cam track. With subsequent activation, the tape head is rotated in the opposite direction.

Detailed Description

Figure 1:
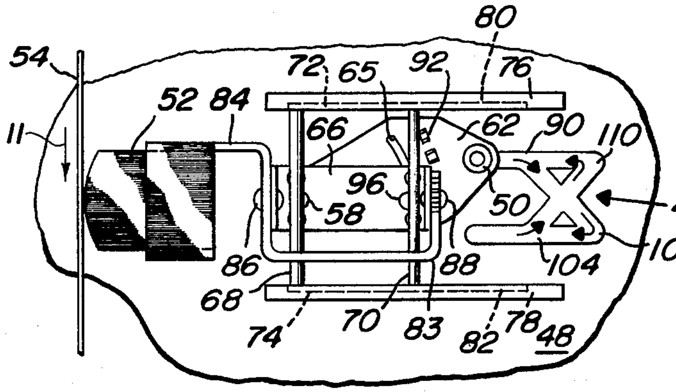
FIG. 1 is a top plan view of another embodiment of the present invention.

Referring to FIGS. 1–4 there is shown one embodiment of a cassette recorder/reproducer employing the present invention. However, a conventional reel tape recorder/reproducer, or other tape device may be used. With a cassette inserted in the recorder/reproducer, the tape head or transducer 52 engages tape 54 with the magnetic pickup 52*a* of the head indexed to one set of tracks on the tape 54. The tape is driven from top to bottom as shown by arrow 11 (FIG. 1), until it reaches the end of the reel. Positioning the tape head to another set of tracks becomes necessary for fully utilizing the tape. Traditionally, the cassette cartridge had to be extracted from the recorder/reproducer, turned over and reinserted before a return track could be utilized. With the present invention this operation is unnecessary. The transducer head 52 is rotated 180° to reposition the pickup portion 52*a* (FIG. 3) to a different set of tracks on the tape rather than repositioning the tape. The direction of the tape is then reversed in a known manner to move from bottom to top (FIG. 1) making it possible to play back or record on the new set of tracks. The apparatus of the present invention for rotating the tape head 54 utilizes a cam track 46 in a base 48 for guiding a spring loaded track pin 50 to disengage the transducer tape head 52 from the tape 54, rotate the same 180° and re-engage it with the tape 54.

Figure 4:
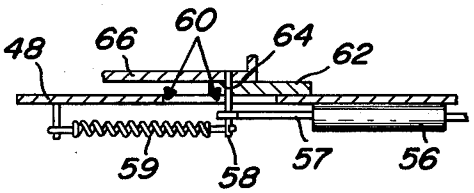
FIG. 4 is a side elevation view in partial cross-section of the actuator mechanism of the embodiment of FIG. 1.

Actuation of the tape head rotator mechanism may be manual or electromechanical. FIG. 4 shows a solenoid 56 mechanically linked by rod 57 to an actuating pin 58, which extends upwardly through slot 60 in the base plate 48, through a hole 64 in a rotatably mounted gear rack plate 62 and through the carriage bracket 66. Upon actuation solenoid 56 draws rod 57 from left to right (FIGS. 1, 3 and 4) disengaging the tape head 52 from the tape 54. Rod 58 linked to rod 57 is drawn in slot 60 to cause the carriage bracket 66 and gear rack plate 62 to move away from the tape. The tape head support frame connected to the carriage bracket 66 by ball bearing movements 86 and 88 is also moved away from the tape. Tension increases in return spring 59 as the tape head is disengaged. The spring causes the tape head to re-engage the tape after the tape head is rotated and the solenoid is disabled.

The carriage bracket 66 is supported on a pair of guide rails 68 and 70. Guide rail 68 engages step-up cam slots 72 and 74, in guide bars 76 and 78 respectively. Guide rail 70 rides in slots 80 and 82 of guide bars 76 and 78, respectively, which provide horizontal guide means. Step-up cam slots 72 and 74 cause the tape head 52 to raise with respect to the base plate 48 when it is moved away from the tape by the solenoid 56.

Figures 2, 3:
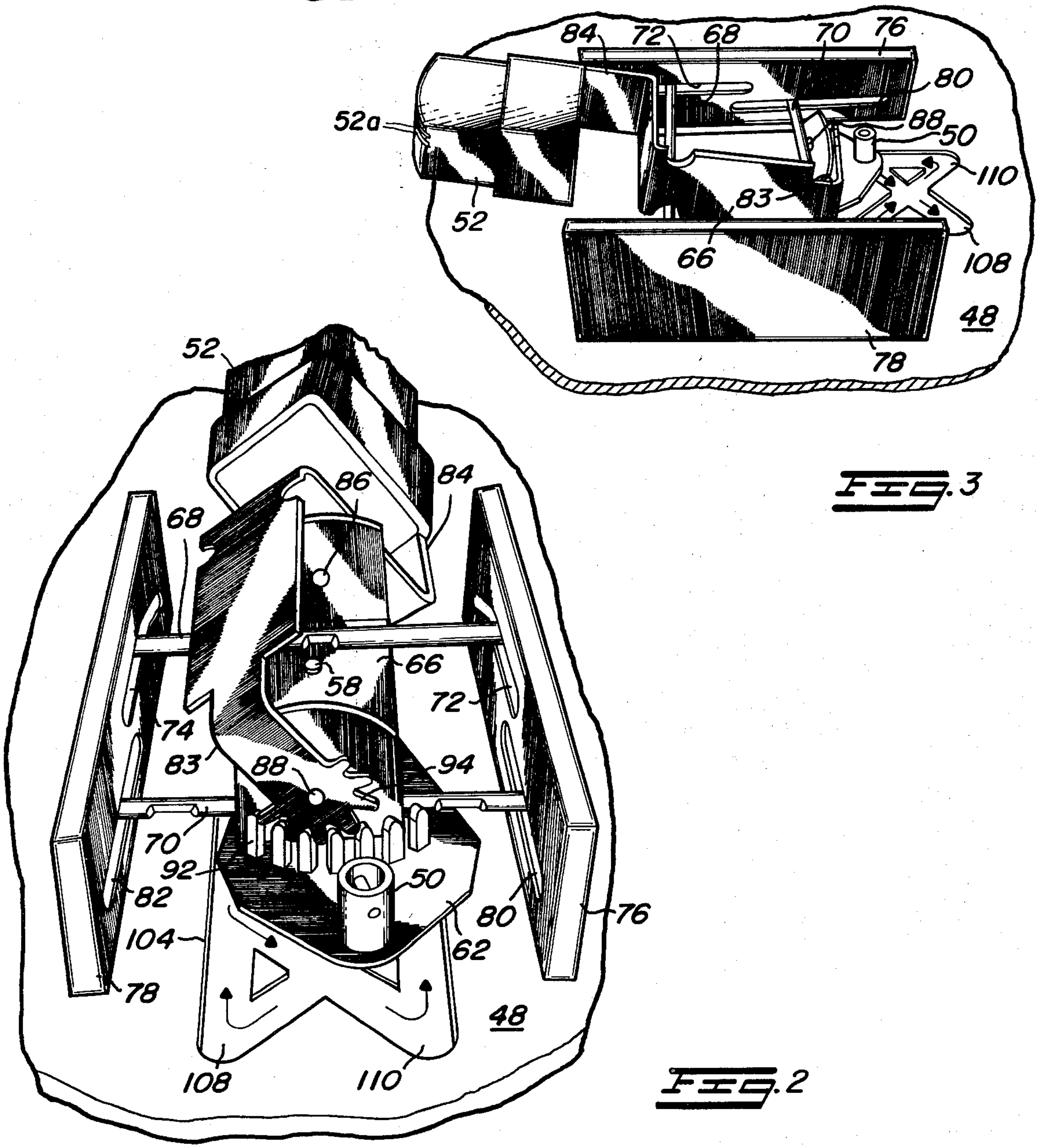
FIG. 2 is a perspective view from the rear of the embodiment of FIG. 1.
FIG. 3 is a side elevation view in perspective of the embodiment of FIG. 3 taken with the tape head partially rotated.

The tape head support frame 84 is mounted to the carriage rack 66 through a pair of ball bearing movements 86 and 88. As the solenoid 56, which may be actuated by the tape, and rod 57 (FIG. 4) draw the actuating pin 58 rearwardly (from left to right in FIG. 4), the tape head 52 is disengaged from the tape 54 with the tape head raising due to the step-up cam slots 72 and 74 to provide clearance for rotation of the tape head 52 with respect to the base plate 48. The track pin 50 slides in the cam slot 46 in the direction of the arrows away from the tape (FIG. 4). At point 90 the track pin begins transverse motion across the base plate in the direction of the arrow drawn nearest point 90 in FIG. 4. The gear rack 92 of the gear rack plate 62 no longer moves only to the rear of the rotating mechanism but also moves from right to left (FIG. 2). With this transverse motion, the gear rack 92 causes the pinion gear 94 to rotate the tape head frame 84. This transverse motion of the track pin also causes a clockwise rotation (FIG. 1) of the gear rack plate 62 about pin 58 which rides on the base plate 48 and carriage bracket 66, with the pin 96 following the arcuate slot 65 in gear rack plate 62.

With the tape head rotated 180°, the solenoid is disabled and the return spring 59 causes the actuating pin 58 to return the tape head 52 to engagement with the tape 54 with the track pin 50 sliding along a second leg or portion 108 of the cam track 46 to its rest position.

Tape head pickup portions **52*a* are now aligned with a different set of tracks. Upon subsequent activation of the rotator mechanism, the solenoid again causes the tape head to disengage and rise to provide clearance from the base plate 46 to rotate in the counter clockwise direction with the track pin following the remaining set of arrows, beginning its transverse motion at point 104 and ending in leg 110 of the cam track 46.**

What we have, therefore, is an economical reel-to-reel tape recorder/reproducer which reproduces all the track on a multi-track tape and which utilizes only one tape head.

I claim:

1. A tape head rotator mechanism for a multitrack tape comprising a tape head having a pickup portion, the pickup portion located on the tape head so that it is aligned with at least one track when the tape head is in a first position and aligned with at least one different track when the tape head is in a second position rotated 180° relative to the first position, a movable carriage, a base plate, means mounting the carriage on the base plate for sliding movement between a forward position engaging the tape head with the tape and a rearward position disengaging the tape head from the tape, means for moving the carriage between the said positions, and means for rotating the tape head 180° when the carriage is moved in a cycle from the forward to the rear position and returned to the forward position including a frame supporting the tape head, means mounting the frame to permit 180° rotation of the frame and tape head relative to the carriage, a second plate, means mounting the second plate to the carriage to provide for movement of the second plate in an arcuate path transverse the path of movement of the carriage, pinion and gear rack means mounted between the frame and the second plate for rotating the frame and tape head 180° and means for moving the second plate relative to the carriage in said accurate path responsive to the carriage being moved from the first position to the second position and back to the first position to effect the desired 180° rotation through the pinion and gear rack means.

2. A tape head rotator mechanism for a multitrack tape as claimed in claim 1 wherein the means for moving the second plate comprises a cam track on the base plate having first and second legs, the cam track having a first leg for rotating the tape head 180° in a first direction when the carriage is cycled a first time and a second leg for rotating the tape head 180° in the opposite direction when the carriage is cycled a second time, a cam follower mounted on the second plate and engaged in the cam track, whereby the cam follower moves in the cam track in response to carriage movement causing movements of the second plate transverse the path of movement of the carriage.

3. A tape head rotator mechanism for a multitrack tape as claimed in claim 1 wherein the means mounting the carriage comprises a pair of upstanding guide members having slots therein, a pair of guide rails connected to the carriage and slideably supported within the slots, the slots being formed with a step-up portion at the forward end thereof for effecting a raising movement of the tape head during the initial rearward travel of the carriage for providing clearance between the tape head and base plate.

4. A tape head rotator mechanism for a multitrack tape as claimed in claim 1 wherein the pinion gear is mounted on the rotatable tape head frame and engages the gear rack which is mounted on the transversely movable second plate and is arcuate shaped, movement of the second plate causing the gear rack to rotate the pinion gear and thereby rotate the tape head frame and the tape head.

5. A tape head rotator mechanism for a multitrack tape as claimed in claim 1 wherein the means for moving the carriage comprises a slot in the base plate, a pin mounted to the carriage and extending through the base plate slot, a solenoid connected to the pin for moving the same rearward in response to a predetermined signal, and biasing means for returning the pin to its original position.

6. A tape head rotator mechanism for a multitrack tape as claimed in claim 5 wherein the solenoid is momentarily activated by the tape.

* * * * *